June 30, 1936. R. M. DARDEN 2,045,839

COMBINED HARVESTING AND THRESHING MACHINE

Filed April 9, 1934

Inventor
Raymond M. Darden
By H.V. Carpenter
Attorney.

Patented June 30, 1936

2,045,839

UNITED STATES PATENT OFFICE 2,045,839

COMBINED HARVESTING AND THRESHING MACHINE

Raymond M. Darden, Endicott, Wash.

Application April 9, 1934, Serial No. 719,729

4 Claims. (Cl. 56—122)

My invention relates to an attachment to or improvement in combined harvesting and threshing machines. The object of my invention is to provide a more satisfactory means of storing the threshed grain and providing for its easy transfer to wagons or trucks. It is particularly adapted for use in hilly country where it is common practice to keep the harvester level by controls on the supporting wheels, controlled by the operator.

Figure 1:
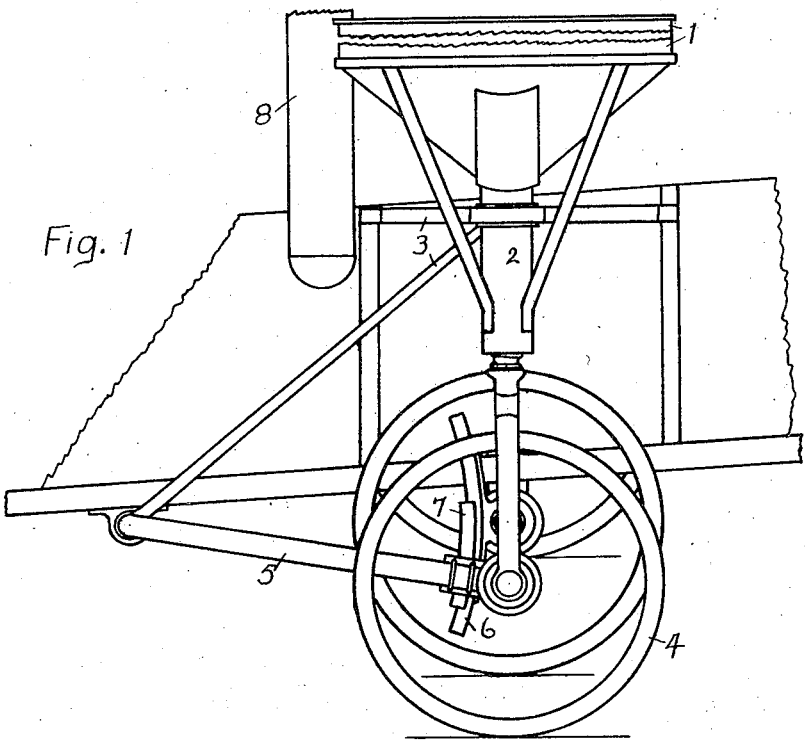
Figure 2:
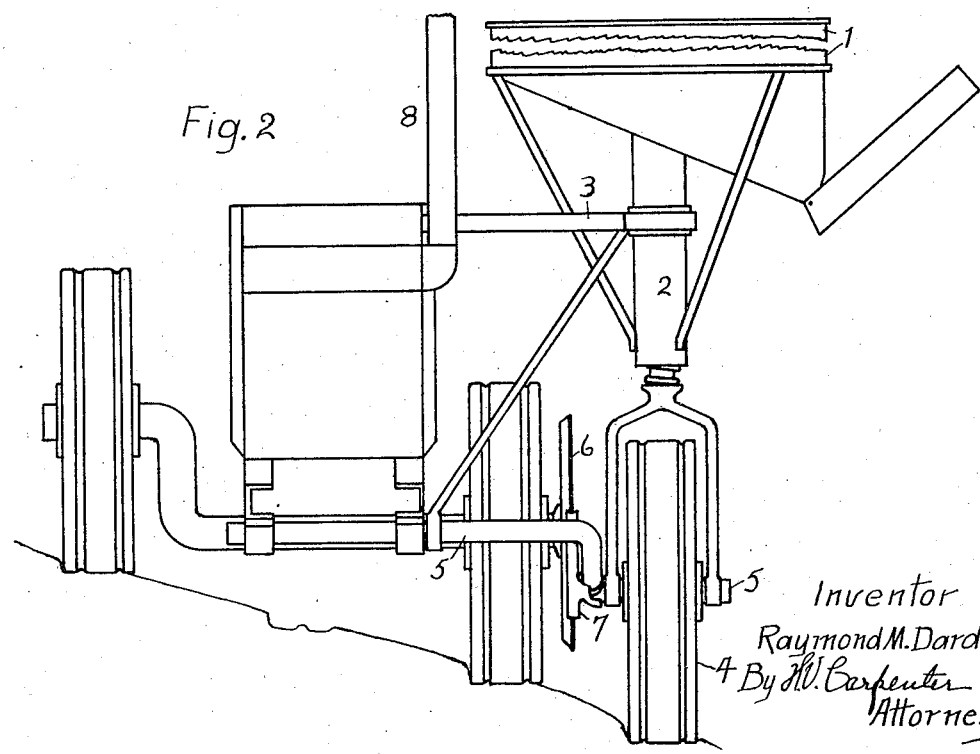

My invention is intended to accomplish the storage and handling of the grain with the least additional load and strain upon the machine and its motive power. I have accomplished this by the mechanism shown in the accompanying drawing in which Figure 1 is a side view and Figure 2 an end view, both having certain easily understood parts of the harvester and tank cut away.

The storage bin, 1, is supported on a forked column, 2, which may or may not be equipped with a spring as shown. This column is guided by the brace, 3, and supported by the wheel, 4. Tractive force is applied to wheel 4 by means of the heavy crank arm 5, which also permits the wheel 4 to rise and fall relative to the main machine, thus accommodating itself to the slope of the hillside, or any irregularities in the ground. The relative motion of wheel 4, with respect to the main axle of the machine, is further guided and steadied by the circular guides, 6 and 7.

The advantages of this device, which I hold make it not only patentable but useful, are: first, that the wheel supporting the stored grain is always vertical and is so placed that it does not interfere in turning the machine, and its operation avoids all undue strains that might otherwise be thrown on the machine tending to upset it or cause it to fail to follow the pulling tractor properly. Further, the load on this wheel tends to counteract the side pull due to the grain wheel and cutter bar which are not shown but are located on the opposite side of the machine.

It will be understood that many different shapes of axles could be used or many differences in detail of the guiding circular arcs, 6 and 7, or in the bracing indicated. Also, the spring shown inside of the column may be used or not, as preferred.

It is also true that this device can be attached to any of the existing types of combined harvesting and threshing machines with a minimum of trouble and expense. While not needed in level countries, it has proven very useful in the hilly grain fields of the Pacific Northwest.

To further emphasize the value of this invention, I wish to add that the design is such that all major strains are applied to the main frame of the harvester, thus avoiding almost completely any additional strains on the upper framework of the harvester due to this attachment.

To clarify the drawing let me add, the vertical No. 8 is the elevator which delivers the grain to the storage tank shown with its top cut away.

In the claims which follow the combined harvester and thresher is referred to as a combine.

I claim:

1. A bulk grain attachment for a combine made up of a bin, a ground wheel, a vertical member which supports said bin at suitable height above said ground wheel, sliding guides serving to permit vertical motion of said bin with reference to the combine frame, a bell crank, one arm of which is the axle of said ground wheel and the other arm being hingeably attached to the main frame of the combine with both arms parallel to the main axle of the combine, said bell crank being so positioned as to maintain said ground wheel upright beside the main wheel while permitting vertical adjustment of said wheel and bin required by uneven ground.

2. An attachment to a combine comprising a storage bin, a vertical forked column, said column being fixed to said bin and maintained vertical and at a fixed distance from the frame of the combine by sliding guides, a bell crank one arm of which is the axle of a ground wheel which supports said bin, the other arm of the bell crank being hingeably attached to the main sills of the combine.

3. A bulk grain attachment to a combine comprising a bin supported on a ground wheel by means of a supporting member, sliding guides which maintain said supporting member upright and at a constant distance from the frame of the combine, a bell crank having one arm hingeably attached to the frame of the combine and the other arm serving as the axle of said ground wheel, said bell crank providing both traction and positioning to said ground wheel.

4. An attachment to a combine comprising a storage bin, a vertical member to support said bin at suitable height, sliding guides which position said vertical member with respect to the frame of the combine, a ground wheel supporting said vertical member and bin and placed beside the main wheel of the combine, a bell crank which serves to direct, position and provide traction for said ground wheel by having one of its arms hingeably attached to the main frame of the combine and the other arm serving as the axle of said ground wheel, said bell crank permitting vertical arc adjustment of said ground wheel and bin relative to the combine.

RAYMOND M. DARDEN.